Aug. 15, 1967 J. P. MARKHAM 3,336,436
SECONDARY SPREADER
Filed Aug. 25, 1966

INVENTOR.
JAMES P. MARKHAM
BY
Roberts, Cushman + Grover
ATTORNEYS

United States Patent Office 3,336,436
Patented Aug. 15, 1967

3,336,436
SECONDARY SPREADER
James P. Markham, Milford, N.H., assignor to Hendrix Wire & Cable Corporation, Milford, N.H., a corporation of New Hampshire
Filed Aug. 25, 1966, Ser. No. 575,034
1 Claim. (Cl. 174—146)

ABSTRACT OF THE DISCLOSURE

The nature and gist of the invention asserted, and the nature and general substance of the subject matter being claimed, is a spreader for use with cabled secondary distribution circuits, which is capable of installation both at the pole and in the space between poles, to facilitate customer service drop connections, and more particularly to provide a safe, easy and economical way of separating the phase conductors and bare neutral at any point.

Background of the invention

The field of art to which the invention pertains is cabled, secondary electric power distribution circuits. Principal among the problems solved by the invention is the safe, easy and economic separation of the phase conductors and bare neutral at any point along the secondary circuit. There has long been a need also and more particularly for a cable spreader as herein provided, which is both shatterproof and weather-resistant, and which is uniquely adapted for installation both at the pole and at mid-span.

Description of the invention

Figure 1:
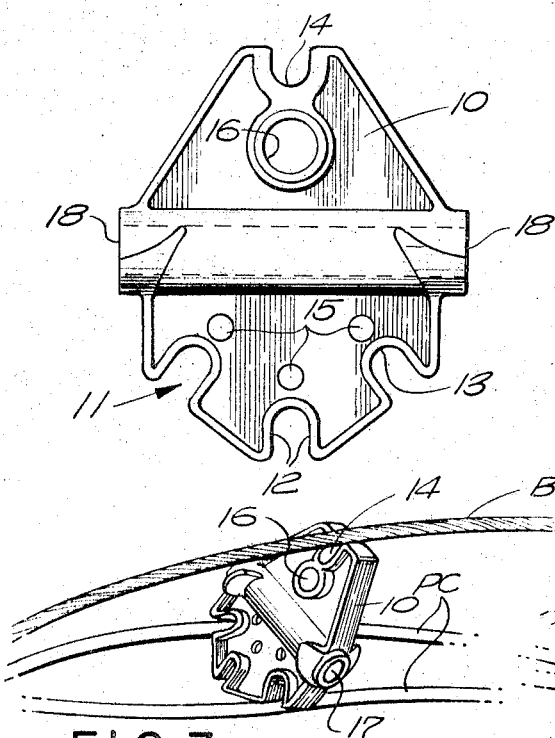
Figure 2:
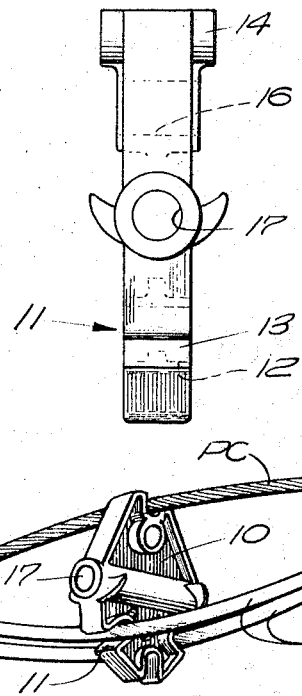
Figure 3:
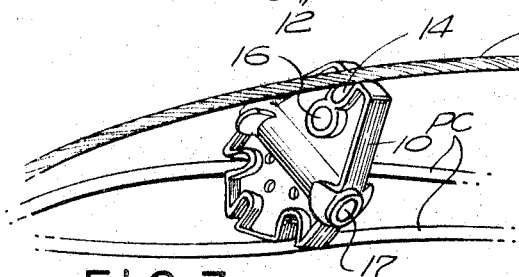
Figure 4:
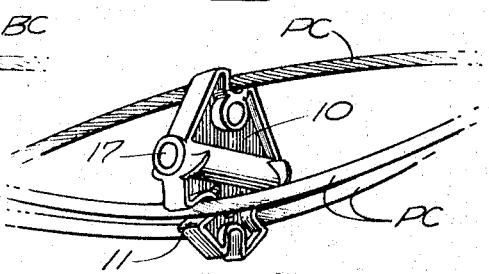
Figure 5:
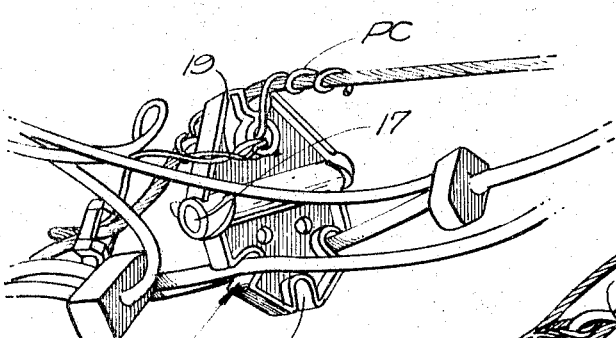
Figure 6:
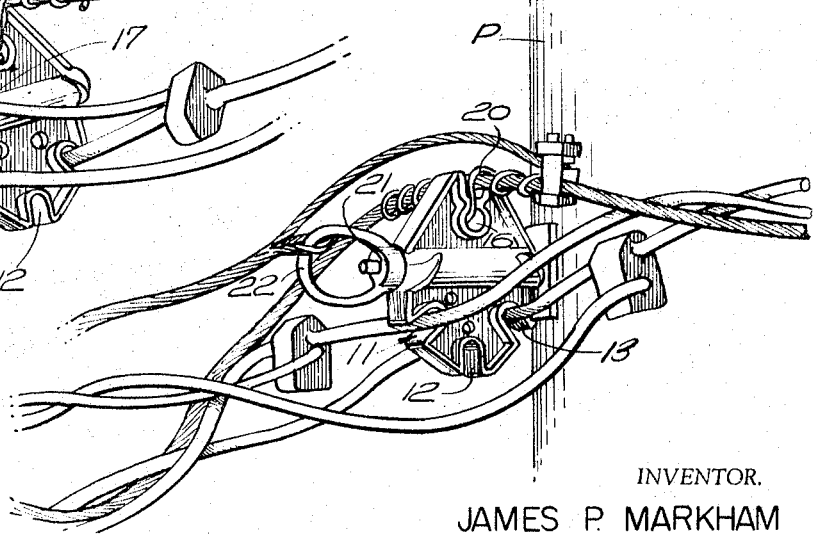

The invention will fully and clearly appear from the following description, taken together with the accompanying drawings of a preferred embodiment and in which:

FIG. 1 is a side view of the invention spreader;
FIG. 2 is an end view of the same;
FIG. 3 shows the inserting of the spreader in the cable;
FIG. 4 shows the spreader in place, ready to receive the neutral tie and service drop attachment;
FIG. 5 shows a completed mid-span installation; and
FIG. 6 shows the complete assembly as rigidly installed at the pole.

The invention spreader comprises a rigid, integral lightweight body 10 of insulating, non-shattering, weather-resistant material, which may be that known commercially as black polyolefin. The body 10 is of generally flat or planar construction, and symmetrical diamond shape, with sloping sides diverging downwardly and upwardly from top and bottom midpoints to the lateral midsection, which projects slightly therebeyond to define the body portion of greatest width.

The spreader body 10 is formed at its under or lower side with saddles or seats 11 for the covered or phase conductors of the secondary cable. The conductor seats 11 are defined by recesses indenting the periphery of the spreader and formed with opposite sides or sidewalls 12 that either are parallel or are convergent slightly toward the mouth or opening of the recess. The phase conductor seats 11 are further defined by half round bottoms 13 that merge with the sides 12, and that are proportioned to receive the largest size conductor with which the spreader is to be used.

The phase conductor seats 11 are in the embodiment shown provided in a plurality to receive 3 phase conductors, and in a generally triangular array, with the center or B phase conductor recess facing vertically downward at the center of the body, and with the side or A and C phase conductor recesses disposed equidistantly from the B phase recess, and oriented similarly and oppositely therefrom to open or incline laterally downward as shown.

At its upper extremity, or top midpoint, the body 10 is provided further with a similarly formed or recessed vertically upward opening saddle or seat 14 for the bare wire neutral conductor of the secondary cable.

Whereas for light weight and low cost the interior wall of the body 10 may be only, say ¼" thick, the seats 11, 14 are seen to extend to either side thereof to a total seat width of, say 1" to 1½", and thereby to firmly support the conductors.

The spacer hereof is additionally formed behind each phase conductor seat 11 with through passage formations 15 through which may be passed tie wires that may then be wound about the phase conductors at either side of the spacer to retain the conductors in their respective seats 11.

A larger diameter through passage 16 is provided below the neutral conductor seat 14 to receive, and may comprise a stainless steel grommet that resists the abrasive action of, the grip for the bare neutral conductor BC and also, at mid-span, the tie wire for the service drop, FIG. 5.

In accordance with the invention the spacer is intermediately formed with a lateral mount hub 17 extending and opening through the widest part of the spreader body 10, which body is formed at its opposite side extremities, about said hub, with vertical bearing surfaces 18.

The spreader hub 17 will be understood to receive a pole carried mount as hereinafter to be described with reference to FIG. 6.

The installation of the invention spreader is indicated generally in FIGS. 3 and 4 to be commenced by spreading apart the spirally wound cable conductors, with the bare wire neutral BC forced upwardly and the insulated phase conductors PC spread apart downwardly, as shown. The spreader is then turned on its side and inserted laterally, or from the side, between the conductors, FIG. 3, with the conductor seats 11, 14 in line with the cable. The spreader and conductors are next relatively positioned such that the neutral conductor overlies the upper seat 14, and the phase conductors underly two of the seats 11. The spreader 10 is then simply turned, or rotated about the lateral axis of its mount 17, to the upright position, FIG. 3. In this the lower seats 11 will be forced downwardly about the phase conductors PC, and the upper conductor seat 14 will be pressed upwardly to receive the neutral BC, as clearly shown in FIG. 4.

FIG. 5 shows a typical mid-span installation of the spacer, in which a preformed grip 19 is used for the service drop take-off. In the attachment of the service drop the grip 19 is run through the grommet 17 opening together with the neutral tie 20.

That the invention spacer is suitable also for rigid installation at the pole is shown in FIG. 6, wherein the spreader 10 is shown as mounted to be received by its hub 19 over a bolt or post 21 rigidly fixed on the pole P, and which mounts in turn a ring or eye 22 threaded and turned up on the post 21 to clamp the spreader 10 between said ring and a back plate or the like 23. The connection of the customer service drop is the same as the mid-span service connection of FIG. 5 except that the preformed grip 19 is passed through the ring 22.

From the foregoing it will be appreciated that the invention spacer provides a safe, easy and economical way for separating the phase conductors and bare neutral, thereby facilitating the connection of customer service drops. The secondary cable spreader hereof is shown also to be at once suitable both for a rigid installation at the plane, and for a selective installation in the span between poles. The secondary cable spreader hereof is seen also to maintain the cable conductors spread apart whereby the necessary taps, and more generally the customer service connection, may be made conveniently, economically, and safely. The cable spreader hereof is disclosed also to employ a conductor spacer body which is both shatterproof and weather-resistant, as well as economical and light-weight.

While one desirable embodiment of the invention has herein been disclosed by way of example, it is to be understood that the invention is broadly inclusive of any and all modifications falling within the terms of the appended claim.

I claim:

A spreader for use with a cabled secondary distribution circuit and for installation to facilitate surface drop connections both mid-span and at the pole, comprising:

- a rigid, integral, planar body of symmetrical diamond shape and insulating, shatter-proof, weather-resistant polyolefin material;
- an intermediate lateral mount hub extending through the widest part of said diamond shape body, said hub adapted to receive and to be clamped over a pole-carried mount post whereby the body may be rigidly installed at the pole, said mount hub terminating in vertical straight parallel wall formations adapted to engage means for said clamping of said body on said pole-carried mount post;
- a plurality of spaced, parallel, triangularly disposed, transverse conductor receiving formations uniformly distributed on the lower side of the body below the mount hub and defining seats for the phase conductors of the secondary circuit, said seat defining conductor receiving formations recessed in the periphery of said body and having parallel straight sides and half round bottoms;
- tie retaining means formed on said body adjacent said conductor receiving means for anchoring tie means passed around the phase conductors whereby said conductors may be releasably secured in said seats;
- a transverse neutral-conductor-receiving formation on the upper side of said body opposite to and paralleling said phase conductor seats; and
- an abrasion resisting bore passage formed in and opening transversely through said body behind said neutral-conductor-receiving formation and adapted to pass therethrough both a tire wire for releasably securing said neutral conductor thereto and a preformed grip for releasably securing a service drop take-off thereto, said abrasion-resisting, tie-receiving bore passage formed by a stainless steel grommet;
- said spreader thereby adapted to easily and economically separate the phase conductors and bare neutral at any point along the secondary circuit and so to facilitate the safe installation of customer service drops both as connected at the pole and as connected in the span between poles.

References Cited

UNITED STATES PATENTS

| 2,921,112 | 1/1960 | Dykstra et al. | 174—43 |
| 3,076,865 | 2/1963 | Volk et al. | 174—146 |
| 3,133,985 | 5/1964 | Nordstrom | 174—43 |

FOREIGN PATENTS

| 1,158,315 | 1/1958 | France. |

OTHER REFERENCES

Hendrix: Electrical World, Oct. 23, 1961, page 106.

LARAMIE E. ASKIN, *Primary Examiner.*